United States Patent [19]

Rodriguez-Cavazos

[11] Patent Number: 4,642,530
[45] Date of Patent: Feb. 10, 1987

[54] RASTER DISTORTION CORRECTION CIRCUIT

[75] Inventor: Enrique Rodriguez-Cavazos, Indianapolis, Ind.

[73] Assignee: RCA Corporation, Princeton, N.J.

[21] Appl. No.: 732,693

[22] Filed: May 10, 1985

[51] Int. Cl.[4] .............................................. H01J 29/56
[52] U.S. Cl. ..................................... 315/371; 315/400
[58] Field of Search ........................ 315/400, 370, 371

[56] References Cited

U.S. PATENT DOCUMENTS

| | | | |
|---|---|---|---|
| 3,329,862 | 7/1967 | Lemke | 315/400 |
| 3,346,765 | 10/1967 | Barkow | 315/400 |
| 3,444,422 | 5/1969 | Wölber | 315/400 |
| 3,940,662 | 2/1976 | Quirke | 315/400 |
| 3,968,402 | 7/1976 | Sahara et al. | 315/400 |
| 3,982,156 | 9/1976 | Monroe | 315/400 |
| 4,020,390 | 4/1977 | Keinath et al. | 315/400 |
| 4,093,895 | 6/1978 | Collette | 315/400 |

OTHER PUBLICATIONS

U.S. patent application Ser. No. 733,661 entitled Gullwing Distortion Corrected Deflection Circuitry for a Square-Planar Picture Tube, in the names of P. E. Haferl et al, filed concurrently with the above-captioned patent application.

Primary Examiner—Theodore M. Blum
Assistant Examiner—D. Cain
Attorney, Agent, or Firm—Eugene M. Whitacre; Joseph J. Laks; Sammy S. Henig

[57] ABSTRACT

A combined top and bottom pincushion and gullwing distortion correction circuit uses nonlinear reactor to introduce an appropriately modulated horizontal frequency and second harmonic of the horizontal frequency component into the vertical scanning current path. The nonlinear reactor functions as a transformer with a secondary that provides a correction voltage in series with the vertical scanning current path. The transformer effectively has two series opposing primary windings magnetically coupled to the secondary. These primaries, energized by waves at the horizontal frequency and the second harmonic frequency, alternately predominate over each other to a variable degree, and in a manner determined by the vertical scanning current, for inducing corresponding voltage at the secondary winding. The secondary winding is coupled to a first tuned circuit that generates a horizontal rate north-south pincushion correction component voltage of the total correction voltage. The secondary winding is also coupled to a second tuned circuit that generates, a horizontal frequency, second harmonic rate gullwing correction component voltage of the total correction voltage.

13 Claims, 9 Drawing Figures

PINCUSHION DISTORTION OF RASTER

GULLWING DISTORTION

RASTER DISTORTION CORRECTION CIRCUIT

This invention relates to circuit arrangements for providing electromagnetic deflection of a cathode ray tube beam to develop a scanning raster with reduced distortion occurring in the development of the raster.

In a television apparatus having means for electromagnetically deflecting an electron beam in a cathode ray tube (CRT), a deflection yoke is positioned about a neck of the CRT and circuit means cause cyclically varying currents to flow in deflection windings of the yoke. A varying electromagnetic field, which is thereby generated, deflects the electron beam and forms a raster on a target of the device. In general, the raster which is formed is desirably rectangular shaped. However, various types of electron beam scanning distortions can occur and cause the generated raster configuration to deviate from the desired rectangle.

One well-known form of raster distortion with which the present invention is concerned is so-called "pincushion" distortion, and, particularly, the "top and bottom" aspect of such distortion. This type of distortion is characterized by a central bowing of the raster scanning lines, the character of the bowing varying from a maximum downward bowing at the raster top through a minimum near the raster middle to a maximum upward bowing at the raster bottom. The bowing is approximately hyperbolically or parabolically shaped. FIG. 1 illustrates the effect of top and bottom pincushion distortion, when left uncorrected, on the shape of horizontal stripes of a crosshatch pattern. This distortion results from the physical geometry of the deflection system as determined by such factors as the size and configuration of the target area and the relative position of an electron beam deflection center with respect to the target.

A well known solution to the top-bottom pincushion distortion problem is to modulate the vertical scanning current at the frequency $f_v$ with a horizontal rate $f_H$ correction current. Thus, during the scanning of a horizontal scan line at the top of the screen of the CRT, for example, the horizontal rate correction current causes a varying change in the vertical scanning current. The varying change is such that at the center of such horizontal line, the vertical scanning current is larger than at the edges. Thus, the center portion of such horizontal scan line is displayed further from the vertical center of the screen of the CRT than at the edge portions of the horizontal scan line. Consequently, the bow-shaped horizontal scan line is modified to appear closer to a horizontal straight line.

Another form of raster distortion with which the present invention is concerned is so-called "gullwing" distortion. This type of distortion is characterized by a multiple bowing or humps of raster scanning lines that are already substantially corrected for pincushion distortion, as illustrated in FIG. 2. The size of the humps varies in accordance with the type of the CRT used. In one example of a CRT, the size of the humps is at a maximum at an intermediate zone between the center of the screen and the top or between the center of the screen and the bottom. The origin of gullwing distortion is the difference between the beam scanning radius of curvature and the tube faceplate radius of curvature. New, flatter faceplate picture tubes having aspherical faceplate curvatures require correction of such gullwing distortion.

A tube of the type having a complex curvature faceplate is described in the following U.S. patent applications, herein incorporated by reference.

1. U.S. patent application Ser. No. 469,772, filed Feb. 25, 1983, in the name of F. R. Ragland, Jr. and entitled, CATHODE-RAY TUBE HAVING AN IMPROVED SHADOW MASK CONTOUR.

2. U.S. patent application Ser. No. 469,774, filed Feb. 25, 1983 in the name of F. R. Ragland, Jr. and entitled, CATHODE-RAY TUBE HAVING A FACEPLATE PANEL WITH A SUBSTANTIALLY PLANAR PERIPHARY.

3. U.S. patent application Ser. No. 469,775, filed Feb. 25, 1983, in the names of R. J. D'Amato et al., and entitled, CATHODE-RAY TUBE HAVING DIFFERENT CURVATURE ALONG MAJOR AND MINOR AXES.

4. U.S. patent application Ser. No. 529,644, filed Sept. 6, 1983, in the names of R. J. D'Amato et al., and entitled, CATHODE-RAY TUBE HAVING A FACEPLATE PANEL WITH AN ESSENTIALLY PLANAR SCREEN PERIPHERY.

In one form of flatter faceplate picture tube, as typified by the RCA 110° COTY-SP, square-planar, 27 V, color television picture tube, A68ACC10X, the formula for the tube faceplate sagittal height, z, in millimeters, with reference to the center of the faceplate is given by:

$$Z = A_1 X^2 + A_2 X^4 + A_3 Y^2 + A_4 X^2 Y^2 + A_5 X^4 Y^2 + A_6 Y^4 + A_7 X^2 Y^4 + A_8 X^4 Y^4,$$

where
X and Y are the distance coordinates, in millimeters, from the faceplate center along the major and minor axes, respectively, and where:

$A_1 = -0.236424229 \times 10^{-4}$
$A_2 = -0.363538575 \times 10^{-8}$
$A_3 = -0.422441063 \times 10^{-3}$
$A_4 = -0.213537355 \times 10^{-8}$
$A_5 = +0.883912220 \times 10^{-13}$
$A_6 = -0.100020398 \times 10^{-9}$
$A_7 = +0.117915353 \times 10^{-14}$
$A_8 = +0.527722295 \times 10^{-21}$.

The picture tube faceplate defined by this formula has a relatively shallow curvature near the center of the faceplate, which increases near the edges along paths parallel to both the major and minor axes of the tube. The overall result is a faceplate of relatively flat appearance and with planar edges, namely, with points along the top, bottom, right and left edges located substantially in a common plane.

The gullwing distortion occurs because of the geometry of the faceplate of the CRT. When a flat face CRT is used, gullwing distortion is noticeable. In flat face picture tubes, the face of the tube is flat near the center and has an increasing radius of curvature near the edges. Multiple radiuses of curvatures cause the corresponding humps that characterize the gullwing distortion.

In accordance with an aspect of the invention, a gullwing distortion correction current at a frequency that is at a harmonic of the horizontal frequency $f_H$, is used for modulating the vertical scanning current during each horizontal scan line time. The gullwing distortion may be corrected by modulating the vertical deflection current by an appropriate gullwing correction waveform, so as to straighten the horizontal scan lines that would have had, otherwise, multiple humps. In one example, the harmonic that is used is the second harmonic.

In accordance with an aspect of the invention, a nonlinear, saturable reactor is used for introducing the appropriately modulated harmonic of the horizontal frequency component into the vertical scanning current paths to correct gullwing distortion. This nonlinear reactor may then advantageously provide the additional function of top-bottom pincushion correction.

In carrying out the invention, the reactor comprises, for example, a two-window three-leg core, with an output winding wound on the center core leg, and with respective halves of an input winding wound on respective different outside core legs. The input winding halves are energized by the same horizontal scanning current but due to their respective polling they tend to drive horizontal flux through the center core leg in mutually opposing directions. Thus when their respective flux contributions are matched in amplitude there is complete cancellation of flux variations at the horizontal frequency or its harmonic, in the center core leg, with the result that no energy at the horizontal frequency or its harmonics is transferred to the output winding. However, should their respective flux contributions differ, cancellation in the central core leg will not take place, with the result that there is effective flux linkage between the output winding and one of the input winding halves; thus, variations at the horizontal frequency or its harmonics will be transferred to the output winding circuit by simple transformer action, the amplitude of the transferred variations depending upon the degree of difference in flux contributions, and the polarity depending upon which flux contribution is predominant.

Dynamic control of the relative horizontal and harmonic flux contributions is afforded by the vertical scanning current, itself, which flows through the output winding on the center core leg. During a first portion of the vertical scan cycle, when vertical scanning current is in a first direction, it induces a flux that (1) opposes a bias flux in a core segment linking the center leg to one outside leg (thereby increasing the permeability of this core segment) and (2) adds to a bias flux in a core segment linking the central leg to the other outside leg, thereby lowering the permeability of this core segment. The reverse is true during a succeeding portion of the vertical scan cycle when the scanning current reverses direction.

Thus, variations of one polarity at the horizontal frequency or its harmonic are transferred to the output winding from one input winding segment with maximum amplitude at a first peak of vertical scanning current; maximum amplitude transfer of opposite polarity variation at the horizontal frequency or its harmonics from the other input winding segment occurs at the succeeding opposite direction peak of vertical scanning current. A polarity crossover occurs intermediate these peaks; a steady decrease in amplitude of the first polarity transfer occurs during approach of the crossover from the first peak, and a steady increase in amplitude of the opposite polarity transfer occurs subsequent to the crossover.

The modulated component at the horizontal frequency or its harmonic thus transferred to the output winding is of the form appropriate for top and bottom pincushion correction or gullwing correction, respectively. This modulated component is then coupled to the vertical deflection winding. This modulated component is provided for resonating a first resonant circuit, that includes the output winding. In accordance with an aspect of the invention, the first resonant circuit is tuned to a harmonic of the fundamental horizontal frequency.

Advantageously, a second resonant circuit may be tuned to the horizontal scanning frequency to provide top and bottom pincushion distortion correction; whereas, in accordance with another aspect of the invention, the first resonant circuit may be tuned to the harmonic. With such tuning, a readily attainable level of control winding voltage will develop sufficient voltage at the horizontal frequency and its harmonic from the second and first resonant circuits, respectively, to add the requisite horizontal frequency current component and harmonic current component, respectively, to the vertical scanning current in the vertical deflection winding.

The horizontal frequency variations introduced by the second resonant circuit will be essentially sinusoidal in shape, but it is observed that such a shape sufficiently approximates the ideal waveshape to producde an acceptable pincushion correction. Similarly, it should be recognized that the amplitude and waveshape of the variations at the harmonic, introduced by the first resonant circuit, only approximate the ideal amplitude and waveshape that is required for providing gullwing distortion correction.

In accordance with an aspect of the invention, a source of vertical scanning current is coupled to a vertical deflection winding and to a control winding of a nonlinear reactor device. A source of horizontal scanning current is coupled to a horizontal deflection winding and to an input winding of the nonlinear reactor device. The nonlinear reactor device includes an output winding. A voltage is produced at the output winding from the horizontal scanning current at the input winding. Such voltage at the output winding is in an amplitude or phase that is in accordance with the vertical scanning current. A current that substantially contains a harmonic of the horizontal scanning frequency is produced from the voltage at the output winding. The vertical scanning current traversing the vertical deflection winding is modulated in accordance with the current that substantially contains the harmonic of the horizontal scanning frequency.

Figure 3:
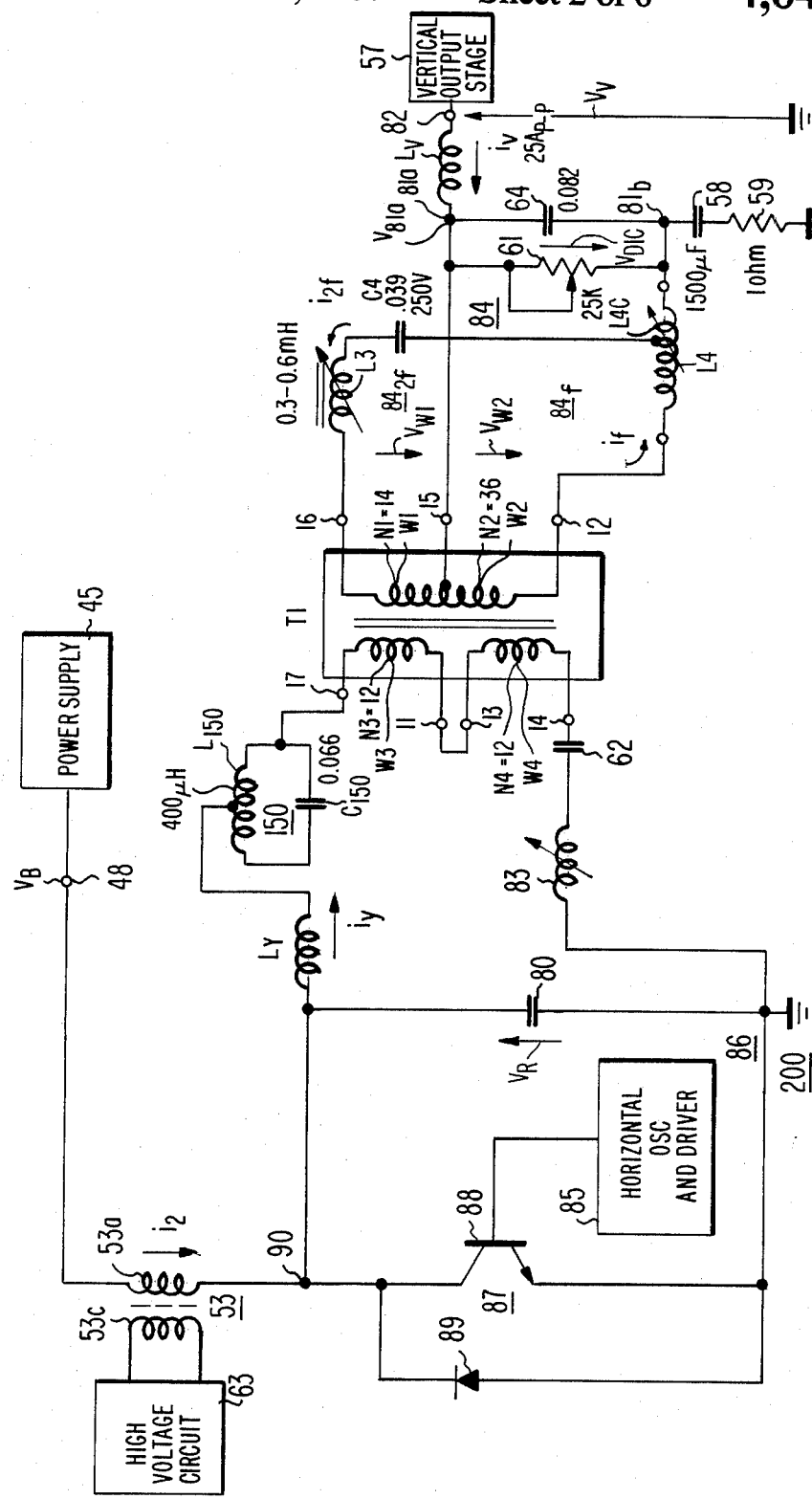
FIG. 3 illustrates a gullwing and top-bottom pincushion distortion correction circuit, embodying an aspect of the invention.
Figure 5:
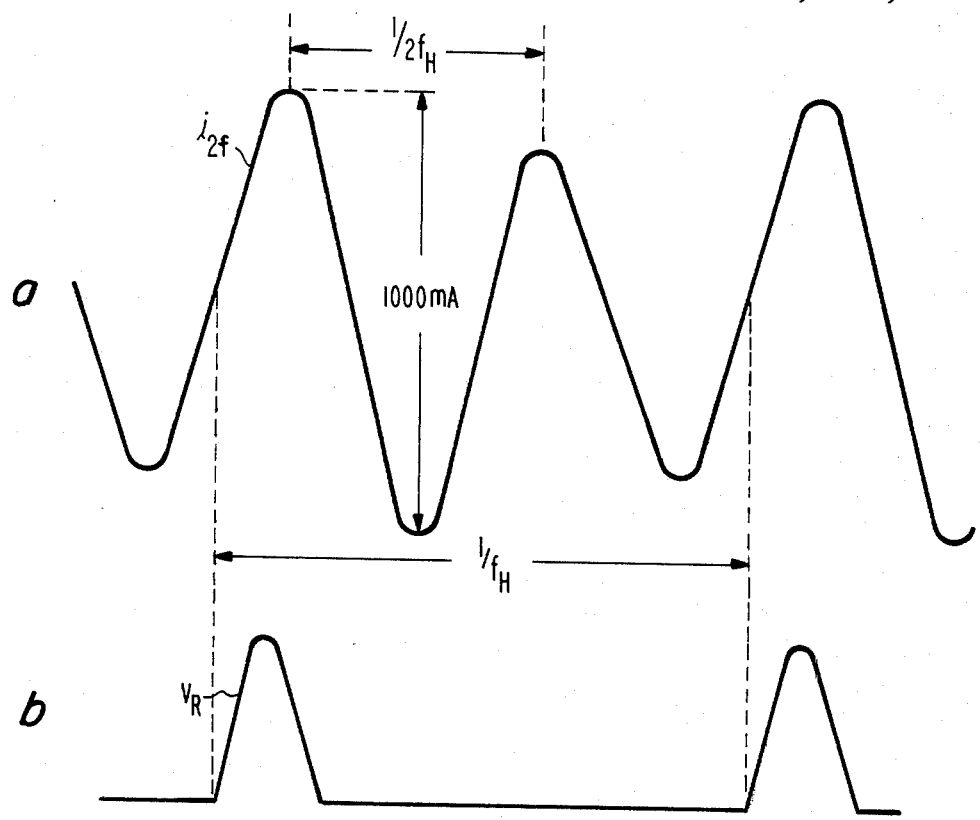
Figure 6:
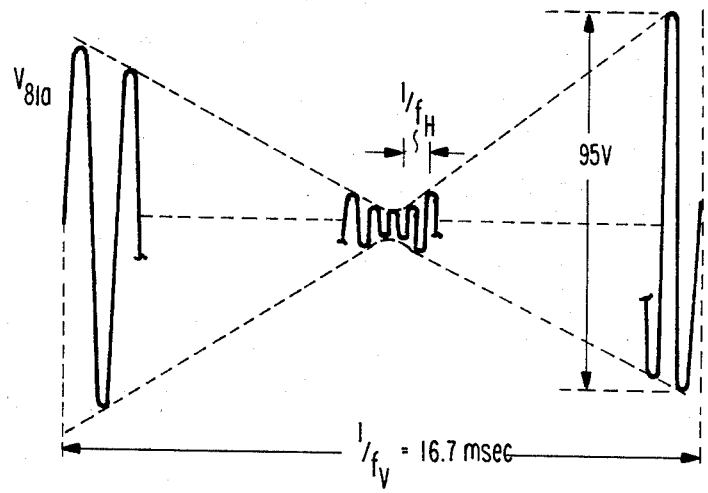
Figure 7:
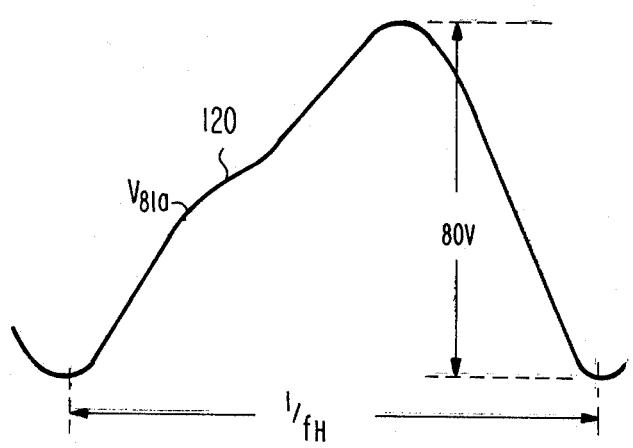
Figure 8:
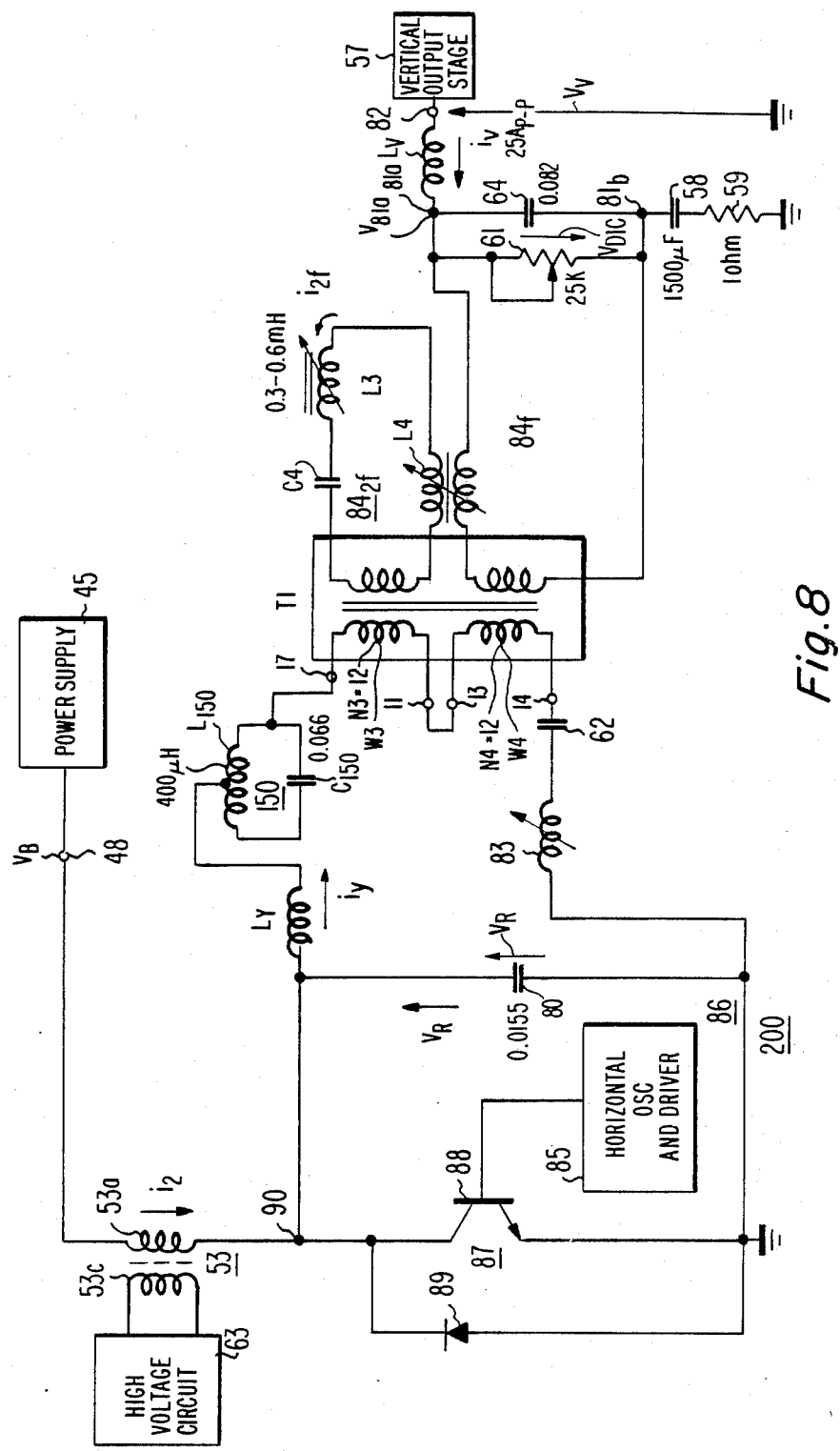

FIG. 5a illlustrates the waveform of a second harmonic of the horizontal scanning current that is used for modulating the vertical rate scanning current for correcting gullwing distortion;

FIG. 5b illustrates a horizontal retrace voltage that is produced simultaneously with the waveform of FIG. 5a;

FIG. 6 illustrates the waveform of a pincushion and gullwing correction voltage, applied to vertical deflection to winding of FIG. 3, that causes the modulation of the vertical scanning current during an entire vertical scanning interval;

FIG. 7 illustrates the waveform of the voltage of FIG. 6 during a single horizontal scanning period; and FIG. 8 illustrates a second embodiment of a gullwing and a top-bottom pincushion correction circuit in accordance with an aspect of the invention, that includes first and second resonant circuits tuned to $f_H$ and $2f_H$, respectively, that are mutually coupled by a transformer action.

In a horizontal deflection circuit 200, illustrated in FIG. 3, a filtered DC voltage $V_B$ from a power supply 45 is developed at a terminal 48. Voltage $V_B$ is coupled through a primary winding 53a of a horizontal output or flyback transformer 53 to a terminal 90 of a horizontal deflection generator 86.

A horizontal deflection winding $L_y$ is coupled to horizontal deflection generator 86. Generator 86 comprises the series arrangement of a linearity inductor 83, a trace capacitor 62, series coupled primary windings w3 and w4 of a nonlinear transformer T1 a dynamic "S" correction circuit 150 and a parallel arrangement of a retrace capacitor 80 and a trace switch 87. Switch 87 comprises the parallel arrangement of a horizontal output transistor 88 and a damper diode 89. Deflection generator 86 is capable of generating scanning current $i_y$ in deflection winding $L_y$ each horizontal deflection cycle. A conventional synchronized horizontal oscillator and driver circuit 85 provides switching control signals to the control base electrode of horizontal output transistor 88 to turn on the transistor during the horizontal trace interval and to turn off the transistor for initiating the horizontal retrace interval. A high voltage winding 53c of flyback transformer 53 is coupled to a conventional high voltage circuit 63 for developing an ultor accelerating potential for beam current.

Dynamic "S" correction circuit 150 includes an inductance $L_{150}$ coupled in parallel with a capacitor $C_{150}$. Inductance $L_{150}$ has an intermediate tap that is coupled to conduct deflection current $i_y$. Circuit 150 interposes a voltage waveform in series with deflection winding $L_Y$ that includes, together with the normal linearity waveform, a second harmonic of the horizontal frequency for reducing residual "S" errors that are associated with flat face CRT.

In operation, deflection switch 87 is closed during the trace interval. When deflection switch 87 is closed, it isolates transformer 53 from deflection winding $L_y$. An upramping primary current $i_2$ in primary winding 53a increases the energy stored in flyback transformer 53 during the trace interval. This stored energy replenishes losses in deflection circuit 86 and energizes high voltage circuit 63, during the retrace interval, when switch 87 is opened. Deflection generator 86 forms with transformer 53 and retrace capacitor 80 a retrace resonant circuit. The energy stored in transformer 53 and deflection winding $L_y$ at the end of the trace interval, is transferred into retrace capacitor 80 to produce a retrace voltage $V_R$ across capacitor 80, during the retrace interval. Horizontal deflection generator 86 generates horizontal rate deflection current $i_y$ in each of winding w3 and w4 of transformer T1 that are series coupled with deflection winding $L_y$. It should be understood that deflection current $i_y$ includes, in addition to current at the fundamental frequency $f_H$, current in harmonic, or multiple, of the fundamental frequency $f_H$.

A vertical deflection output stage 57 that generates a vertical rate driving voltage $V_v$, is coupled to a terminal 82 of a vertical winding $L_v$. A distortion correction voltage generating circuit 84 is coupled between a terminal 81a that is coupled to the other end terminal of deflection winding $L_v$ and a terminal 81b. Terminal 81b is coupled to ground through a current sampling resistor 59 in series with a coupling capacitor 58. Distortion voltage generating circuit 84 develops voltage $V_{DIC}$ between terminals 81a and 81b that modulates vertical current $i_v$ through deflection winding $L_v$.

FIG. 6 illustrates the waveform of voltage $V_{81a}$ at terminal 81a of FIG. 3 that is representative of correction voltage $V_{DIC}$ across capacitor 64. Voltage $V_{DIC}$ has an amplitude that varies at the vertical rate. FIG. 7 illustrates the waveform of voltage $V_{81a}$ of FIG. 3 in an expanded scale. Note that $2 \times f_H$ rate component is included in voltage $V_{81a}$ that is illustrated by undulating waveform 120 of FIG. 7.

Voltage $V_{DIC}$ of FIG. 3 modulates vertical scanning current $i_v$ by varying the vertical position of the electron beam in the CRT, that is not shown in the figures. Voltage $V_{DIC}$ compensates for the the humps of the gullwing distortion shown in FIG. 2, by modulating the vertical deflection current with a harmonic of the horizontal rate frequency so as to cause vertical deviation that is opposite in direction to that of the humps. Thus, the gullwing distortion is corrected by introducing vertical deflection current that follows the distortion and, thereby, "straightens" the horizontal scan lines.

Distortion correction voltage generating circuit 84 includes transformer T1 that is, illustratively, a saturable-core transformer having output windings w1 and w2 coupled in series. Distortion correction voltage generating circuit 84 includes a resonant circuit $84_f$ that is tuned to the horizontal frequency $f_H$. Resonant circuit $84_f$ includes secondary winding w2 of transformer T1 between terminals 12 and 15 that energizes a capacitor 64 between terminals 81a and 81b and an inductor L4 between terminals 12 and 81b. Capacitor 64, inductor L4 and winding w2 form series resonant circuit $84_f$. As explained later on, a horizontal rate $f_H$ current if that flows in inductor L4 and capacitor 64 generates the horizontal rate $f_H$ component of voltage $V_{DIC}$ of circuit 84 that corrects pincushion distortion.

In accordance with an aspect of the invention, distortion voltage generating circuit 84 also includes a resonant circuit $84_{2f}$ that is tuned to, illustratively, the second harmonics $2f_H$ of the fundamental frequency $f_H$ of scanning current $i_y$. Resonant circuit $84_{2f}$ includes windings w1 and w2 of transformer T1 coupled in series between end terminals 16 and 12 that energize a series arrangement of a gullwing distortion correcting tuning inductor L3, a capacitor C4 and the inductive impedance of inductor L4 that is interposed between a terminal L4c of inductor L4 and terminal 12 of transformer T1. Thus, inductor L3, inductor L4, windings w1 and w2 and capacitor C4 form series resonant circuit $84_{2f}$. As explained later on, a current $i_{2f}$ that flows in inductor L3 and capacitor C4, provides the second harmonic rate component of voltage $V_{DIC}$ of circuit 84 that corrects gullwing distortion. It should be understood that inductor L4 combines currents $i_{2f}$ and $i_f$ at the harmonics $2f_H$ and fundamental frequency $f_H$, respectively, for generating the respective components of gullwing and pincushion correction voltage $V_{DIC}$.

Figure 4:
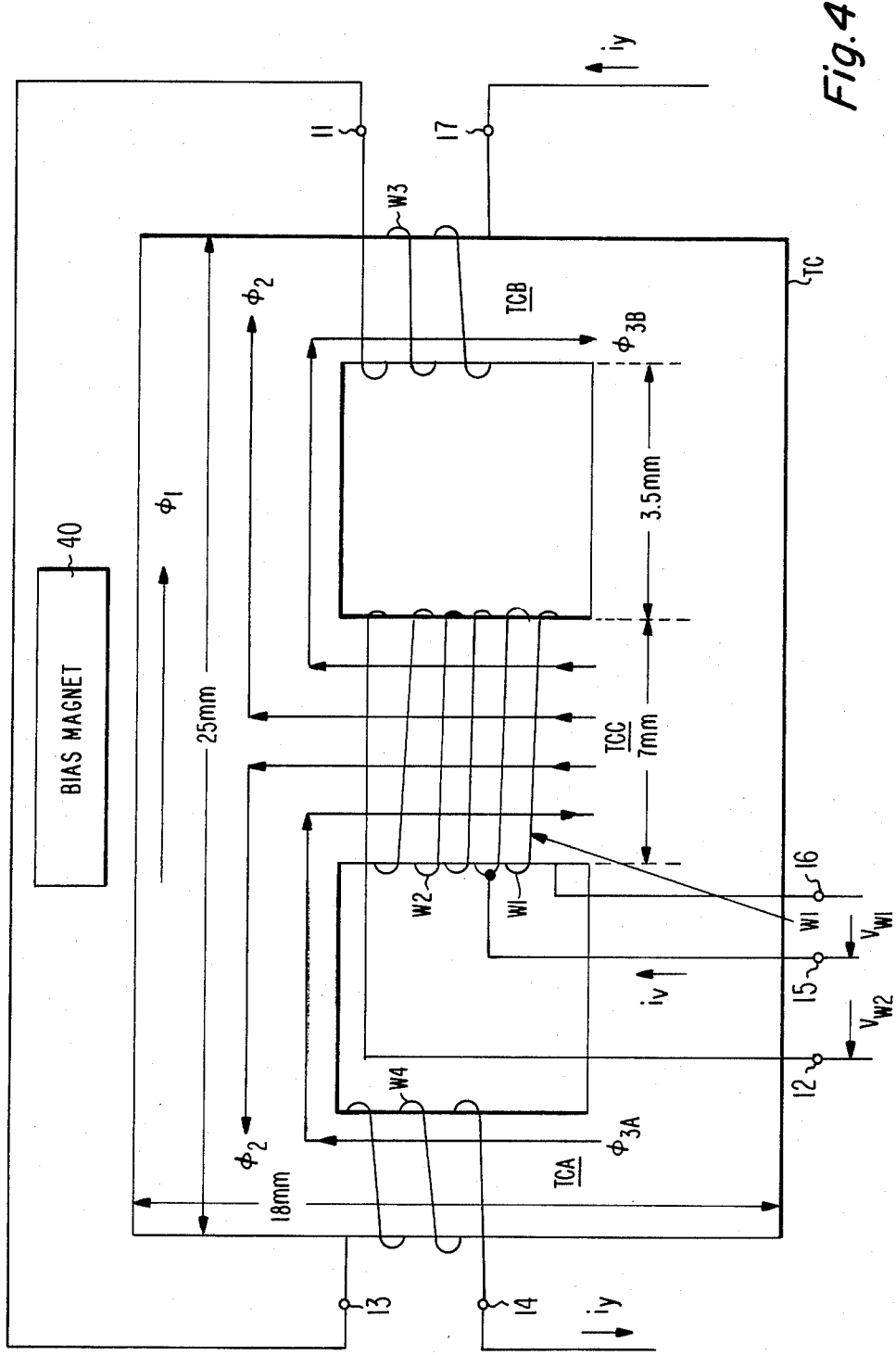
FIG. 4 illustrates a nonlinear reactor device that is used in the circuit of FIG. 3.

Saturable transformer T1 of FIG. 3 is illustrated in FIG. 4. Similar numbers and symbols in FIGS. 3 and 4 indicate similar items or functions. Output winding w1 and w2 are wound on center segment or leg TCC of a core TC. Primary windings w3 and w4 are wound on the outside segments or legs TCB and TCA, respectively, of core TC. A permanent magnet 40 introduces a bias magnetic flux $\phi1$ in the direction shown in FIG. 4. Vertical deflection current $i_v$ of FIG. 3 substantially flows through terminal 15, at the junction of windings w1 and w2 to produce a flux $\phi 2$ of FIG. 4 which is proportional in magnitude and polarity to vertical deflection current $i_v$ of FIG. 3. Horizontal scanning current $i_y$ in windings w3 and w4 of FIG. 3 produces a flux $\phi 3A$ and a flux $\phi 3B$, respectively. Flux $\phi 3A$ is opposed to flux $\phi 3B$ in center leg TCC because of the way windings w3 and w4 of FIG. 3 are coupled to conduct current $i_y$.

When vertical deflection current $i_v$ is zero, as it is when the electron beam is at the center of the raster, the flux in each of the outer legs TCB and TCA of core TC is balanced and flux $\phi 3A$ = flux $\phi 3B$. Therefore, there will be no induced voltage in windings w1 and w2.

At one extreme, for example, when the beam is at the top of the raster and vertical deflection current $i_v$ is at its maximum positive value, flux $\phi 2$ is, illustratively, polarized to add to flux $\phi 1$ in leg TCB and to subtract from flux $\phi 1$ in leg TCA of core TC. The permeability of core TC material may be, illustratively, characterized by an S-shaped curve of permeability versus flux that is typical for ferromagnetic material. Thus, flux $\phi 2$ in leg TCB tends to decrease the permeability of core TC material in leg TCB, while flux $\phi 2$ in leg TCA tends to increase the permeability in leg TCA. Because the permeability is different in legs TCA and TCB, flux $\phi 3A$ and flux $\phi 3B$ are no longer equal at center leg TCC. Consequently, a voltage $V_{w2}$ and a voltage $V_{w1}$ are induced across windings w1 and w2, respectively. Each of voltages $V_{w1}$ and $V_{w2}$ is, in this case, proportional, illustratively, to the value of flux $\phi 3A$ less flux $\phi 3B$.

In contrast, at the extreme bottom of the raster, when vertical deflection current $i_v$ of FIG. 3 is at its maximum negative value, the induced voltage $V_{w1}$ and $V_{w2}$ are proportional to the value of flux $\phi 3B$ less flux $\phi 3A$. Thus each of induced voltages $V_{w1}$ and $V_{w2}$ is of the opposite phase at the bottom of the raster relative to its respective phase at the top.

At points between these extremes, the difference between flux $\phi 3A$ and flux $\phi 3B$ is directly dependent on the magnitude and phase of flux $\phi 2$ that is caused by vertical deflection current $i_v$. Therefore, a decreasing correction is achieved toward the center of the raster. A reversal of phase of correction is achieved near the center, and an increasing correction is achieved toward the bottom of the raster.

It should be understood that bias magnet 40 is not essential for creating the nonlinearity of the flux in core TC. Such nonlinearity may be obtained by a judicious selection of core material for core TC.

Voltage $V_{w2}$ of FIG. 3 produces horizontal rate current $i_f$ in resonant circuit $84_f$. Current $i_f$ produces a corresponding horizontal rate component of voltage $V_{DIC}$ across capacitor 64. The phase of the horizontal rate component and that of the harmonic component of voltage $V_{DIC}$ is controlled by phase adjusting inductor L4 to provide, for example, maximum amplitude of the horizontal rate modulation at the center of each line scan for properly phased n-s correction.

In carrying out an aspect of the invention, the sum voltage of voltages $V_{w1}$ and $V_{w2}$, between terminals 12 and 16 of transformer T1 of FIG. 3, produces current $i_{2f}$ in resonant circuit $84_{2f}$ that is predominantly at the second harmonic of the fundamental horizontal frequency. FIG. 5a illustrates the waveform of current $i_{2f}$ of FIG. 3. FIG. 5b illustrates the simultaneous retrace waveform of voltage $V_R$ across retrace capacitor 80.

Figure 1:
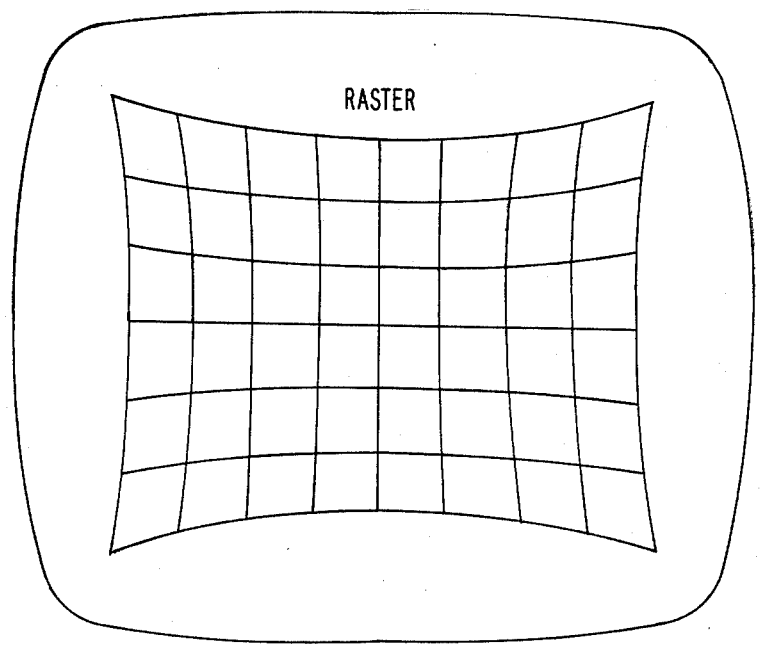
FIG. 1 illustrates pincushion distortion of a raster.
Figure 2:
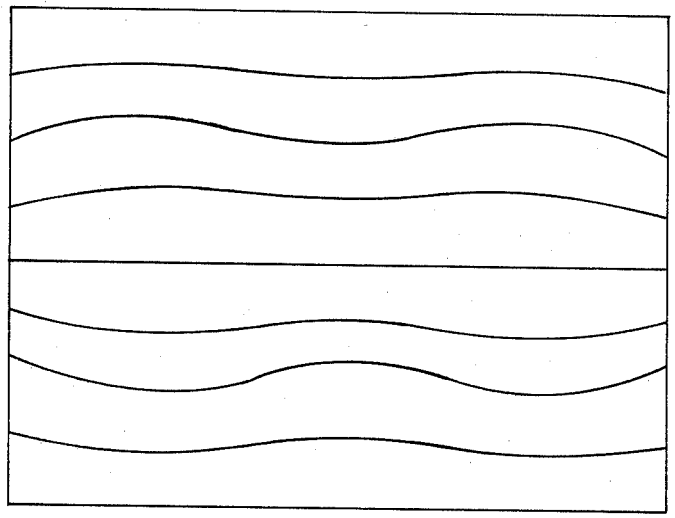
FIG. 2 illustrates gullwing distortion of a raster.

Filtering action by capacitor C4 and inductor L3 produces current $i_{2f}$ that has a substantial cosine waveform as illustrated in FIG. 5a. The amplitude of current $i_{2f}$ varies at a vertical rate, as illustrated in FIG. 6, in accordance with the vertical rate amplitude variations of current $i_v$ in winding W2. Current $i_{2f}$ reverses its phase at the center of vertical trace. This vertical rate envelope of current $i_{2f}$ provides to an approximate degree, the level of gullwing correction vertical displacement, since such gullwing distortion varies in magnitude in a vertical manner, as illustrated in FIG. 2.

Alignment of distortion voltage generating circuit 84 is done, illustratively, by adjusting inductor L4 to obtain maximum amplitude of voltage $V_{81a}$, adjusting inductor L3 for obtaining maximum current $i_{2f}$, readjusting inductor L4 for obtaining symmetrical right and left distortion correction on the CRT screen, and then adjusting resistor 61 for obtaining straight lines at the top and bottom of the CRT screen.

FIG. 8 illustrates another embodiment of the invention. Similar numbers and symbols in FIGS. 3 and 8 indicate similar items or functions. The circuit of FIG. 8 is similar to that of FIG. 3 but with the difference that is noted below. In the circuit of FIG. 8 resonant circuit $84_{2f}$ is coupled to capacitor 64 by a transformer action. Thus, unlike in the circuit of FIG. 3, resonant circuit $84_{2f}$ of FIG. 4 is not coupled to capacitor 64 by conductive coupling.

Transformer T1 windings W1 and W2 of FIG. 4 have a combined resistance of 3.3 ohms between terminals 12 and 16. Each of winding W3 and W4 has 0.08 ohm resistance. The inductance, at 15750 Hz, between terminals 12 and 16 is 320 microhenry. The inductance between terminals 14 and 17, when terminals 13 and 11 are shorted, is 26 microhenry. The core material of core TC is H3TEi25 made by TDK Co., Japan.

I claim:

1. In a cathode ray tube scanning system including a deflection yoke having a respective horizontal and vertical deflection windings, a source of horizontal scanning current at a horizontal scanning frequency, a source of vertical scanning current at a vertical scanning frequency, and first means for coupling said yoke to said first and second sources in such manner that said horizontal scanning current is caused to traverse said horizontal deflection winding and said vertical scanning current is caused to traverse said vertical deflection winding, raster distortion correction apparatus comprising:

a nonlinear reactor including a first winding responsive to a signal at a first frequency that is related to said horizontal scanning frequency for generating in a second winding of said reactor an output signal at a frequency that is related to said first frequency;

means coupled to said second winding of said nonlinear reactor and responsive to said output signal for producing a first modulating current that is predominantly at a harmonic which is greater than said first frequency;

means responsive to a signal operating at a frequency that is related to said vertical scanning frequency and coupled to said first modulating current producing means for varying the amplitude of said first modulating current in accordance therewith; and means coupled to said vertical deflection winding for modulating the vertical scanning current in accordance with said first modulating current.

2. The raster distortion correction apparatus as recited in claim 1 wherein said first modulating current provides gullwing distortion correction.

3. The raster distortion correction apparatus as recited in claim 1 wherein said nonlinear reactor is a saturable reactor.

4. The raster distortion correction apparatus as recited in claim 1 wherein said first modulating current producing means comprises a first resonant circuit that is coupled to said second winding, and wherein said first resonant circuit is tuned to said harmonic of the horizontal frequency.

5. The raster distortion correction apparatus as recited in claim 1 wherein the frequency of said first modulating current is the second harmonic of the horizontal frequency.

6. The raster distortion correction apparatus as recited in claim 1 further comprising, means coupled to said first winding of said nonlinear reactor for producing a second modulating current that is predominantly at the horizontal scanning frequency, wherein the amplitude of said second modulating current is varied in accordance with said signal operating at said frequency that is related to said vertical scanning frequency, and wherein said vertical scanning current modulating means modulates said vertical scanning current in accordance with said second modulating current.

7. The raster distortion apparatus as recited in claim 6 wherein said second modulating current provides north-south pincushion correction.

8. The raster distortion apparatus as recited in claim 6 wherein said first and second modulating currents produce a corresponding modulating voltage in the current path of said vertical scanning current.

9. In a cathode ray tube scanning system including a deflection yoke having respective horizontal and vertical deflection windings, a source of horizontal scanning current, a source of vertical scanning current, and first means for coupling said yoke to said first and second sources in such manner that said horizontal scanning current is caused to traverse said horizontal deflection winding and said vertical scanning current is caused to traverse said vertical deflection winding, raster distortion correction apparatus comprising:
 a nonlinear reactor including an input winding and a control winding;
 means coupled to said input winding of said nonlinear reactor for producing a first modulating current that substantially contains a harmonic of the horizontal scanning frequency;
 means responsive to a signal operating at a vertical rate for varying the amplitude of said first modulating current in accordance therewith; and
 means coupled to said vertical deflection winding for modulating the vertical scanning current in accordance with said first modulating current, wherein said first modulating current producing means comprises a phase shifting means for selectively phase shifting the phase of said modulating current so as to produce said deflection current that follows a gullwing distortion in said cathode ray tube.

10. In a cathode ray tube scanning system including a deflection yoke having respective horizontal and vertical deflection windings, a source of horizontal scanning current, a source of vertical scanning current, and first means for coupling said yoke to said first and second sources in such manner that said horizontal scanning current is caused to traverse said horizontal deflection winding and said vertical scanning current is caused to traverse said vertical deflection winding, raster distortion correction apparatus comprising:
 a body of ferromagnetic material arranged in a multiple-window magnetic circuit configuration having first and second outside body segments and a center segment;
 means for establishing a magnetic bias flux in said body;
 first and second series coupled input windings positioned respectively about said first and second outside body segments and coupled in the current path of said horizontal scanning current;
 first and second output windings positioned about said center segment, and having said first output winding coupled in the current path of said vertical scanning current for developing in one of said first and second output windings a corresponding current having an amplitude that varies in accordance with said vertical scanning current;
 a first tuned circuit that is tuned to a harmonic that is greater than the horizontal scanning frequency, said first tuned circuit being responsive to said corresponding current in said one of said first and second output windings for producing a first modulating current at the frequency of said harmonic;
 means for developing from said first modulating current at said harmonic of the horizontal scanning frequency a vertical scanning current modulating voltage; and
 means for modulating said vertical scanning current in accordance with said vertical scanning current modulating voltage.

11. The raster distortion correction apparatus as recited in claim 10 wherein said first input winding induces in said center segment oppositely poled flux, relative to the flux that is induced by said second input winding.

12. The raster distortion correction apparatus as recited in claim 10 further comprising, a second tuned circuit that is tuned to the horizontal scanning frequency and that is responsive to said corresponding current in said second output winding for producing a second modulating current at the horizontal frequency having an amplitude that varies in the vertical scanning frequency and wherein said vertical scanning current modulating voltage developing means develops said vertical scanning current modulating voltage in accordance with said second modulating current.

13. The apparatus as recited in claim 12 wherein said first modulating current is coupled to said vertical scanning current modulating voltage developing means by only magnetic coupling.

* * * * *